United States Patent
Mattina et al.

(10) Patent No.: US 11,585,508 B2
(45) Date of Patent: Feb. 21, 2023

(54) MULTI-COMPONENT INJECTION MOLDED PRIMARY OPTIC, HEADLAMP OF A MOTOR VEHICLE AND MOTOR VEHICLE

(71) Applicant: Hella GmbH & Co. KGaA, Lippstadt (DE)

(72) Inventors: Giuseppe Mattina, Lippstadt (DE); Sebastian Scholz, Soest (DE); Bernd Losch, Erwitte (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 17/285,037

(22) PCT Filed: Nov. 23, 2018

(86) PCT No.: PCT/EP2018/082424
§ 371 (c)(1),
(2) Date: Apr. 13, 2021

(87) PCT Pub. No.: WO2020/104043
PCT Pub. Date: May 28, 2020

(65) Prior Publication Data
US 2022/0026037 A1   Jan. 27, 2022

(51) Int. Cl.
F21S 41/20 (2018.01)
F21S 41/143 (2018.01)
F21S 41/151 (2018.01)
B29C 45/16 (2006.01)
F21S 41/29 (2018.01)

(52) U.S. Cl.
CPC ........... *F21S 41/285* (2018.01); *F21S 41/143* (2018.01); *F21S 41/151* (2018.01); *B29C 45/16* (2013.01); *F21S 41/29* (2018.01)

(58) Field of Classification Search
CPC ...... F21S 41/285; F21S 41/143; F21S 41/151; F21S 41/29; B29C 45/16; B29K 2033/12; B29K 2069/00; B29L 2011/00; B29L 2031/3005
See application file for complete search history.

(56) References Cited

U.S. PATENT DOCUMENTS

| | | | |
|---|---|---|---|
| 10,422,503 B2* | 9/2019 | Raleigh | F21V 5/04 |
| 2009/0296239 A1* | 12/2009 | Shimizu | G02B 3/08 |
| | | | 359/796 |
| 2013/0148363 A1* | 6/2013 | Choquet | B29C 45/16 |
| | | | 362/335 |
| 2014/0268810 A1* | 9/2014 | Marquardt | F21V 7/28 |
| | | | 29/829 |

(Continued)

FOREIGN PATENT DOCUMENTS

| | | | | |
|---|---|---|---|---|
| CN | 104703769 B | * | 6/2017 | B29C 39/021 |
| DE | 102011003497 A1 | * | 8/2012 | F21S 41/141 |
| DE | 102012009596 A1 | | 11/2013 | |

(Continued)

*Primary Examiner* — Erin Kryukova
(74) *Attorney, Agent, or Firm* — Husch Blackwell LLP

(57) ABSTRACT

A primary optic for a headlamp of a motor vehicle is provided. The primary optic is a multi-component injection molding comprising at least two injection molded photometrical components coupled to each other, whereby the at least two photometrical components are arranged to consecutively receive light emitted by a light source.

8 Claims, 4 Drawing Sheets

(56) References Cited

U.S. PATENT DOCUMENTS

2016/0131327 A1    5/2016   Moon et al.
2017/0114976 A1    4/2017   Beev et al.

FOREIGN PATENT DOCUMENTS

| EP | 2693111 A1 | | 2/2014 | |
|----|------------|---|--------|---|
| EP | 2784374 A1 | | 10/2014 | |
| FR | 3053442 A1 | | 1/2018 | |
| FR | 3063337 A1 | | 8/2018 | |
| WO | WO-2004032250 A1 | * | 4/2004 | ............. B29C 45/16 |

* cited by examiner

MULTI-COMPONENT INJECTION MOLDED PRIMARY OPTIC, HEADLAMP OF A MOTOR VEHICLE AND MOTOR VEHICLE

CROSS REFERENCE

This application claims priority to PCT Application No. PCT/EP2018/082424, filed Nov. 23, 2018, the entirety of which is hereby incorporated by reference.

FIELD OF THE INVENTION

The present invention is directed to a primary optic for a headlamp of a motor vehicle. The invention is further directed to a headlamp for a motor vehicle comprising the primary optic of the invention. Moreover, the invention is directed to a motor vehicle comprising at least one headlamp of the invention.

BACKGROUND

A primary optic is arranged as a first optical element in front a light source. It is commonly used as a part of headlamps in motor vehicles, to receive light emitted by the light source of the headlamp and to refract the light, giving it a direction in order to illuminate a road on which the motor vehicle is traveling.

Primary optics for use in headlamps of motor vehicles are high-precision optical elements, which are typically manufactured by means of injection molding. Generally, injection molding is a cost-effective manufacturing method. However, a certain thickness of the primary optic of typically 3 to 5 mm, which the light must pass in order to be sufficiently refracted, is required when applying the primary optic in headlamps of motor vehicles. Due to the required large thickness, the primary optics are particularly susceptible to shrinkage of the mold at the time of cooling and solidifying, which can result in poor size accuracy of the injection molded primary optic. Thus, a further manufacturing step of machining the injection molded primary optics is obligatory to assure that it is within specified nominal dimensions. This additional step is cost-intensive and time-consuming.

SUMMARY OF THE INVENTION

Therefore, it is an object of the present invention, to provide a primary optic for a headlamp of a motor vehicle, which is easy to manufacture at reduced or at least relatively moderate production costs. Further objects of the present invention are to provide a headlamp and a motor vehicle, which are easy to manufacture at reduced or at least relatively moderate production costs.

The features and details described in connection with the primary optic of the invention apply in connection with the headlamp of the invention and the motor vehicle of the invention and the other way around, so that regarding the disclosure of the individual aspects of the invention it is or can be referred to one another.

According to a first aspect of the invention, the problem is solved by a primary optic for a headlamp of a motor vehicle, whereby the primary optic is a multi-component injection molding comprising at least two injection molded photometrical components coupled to each other, whereby the at least two photometrical components are arranged to consecutively receive light emitted by a light source. By means of manufacturing the primary optic as at least two photometrical components, each photometrical component has a relatively smaller thickness than the primary optic itself. Due to the photometrical components being thinner than the primary optic, the shrinkage at the time of cooling and solidifying of each of the photometrical components is less than the shrinkage of a primary optic manufactured as a single component. In fact, it has been found that the overall shrinkage of all photometrical components of the primary optic of the invention taken together is less than the shrinkage of a primary optic manufactured as a single component. Thus, the shrinkage of the primary optic of the invention is reduced. To assure that the primary optic is within the specified nominal dimensions, further steps of machining the primary optic of the invention are thereby significantly reduced or dispensable. Therefore, the primary optic provided by the invention has a better size accuracy compared to the state of art primary optics and can be manufactured within the specified nominal dimensions more cost-effective and time-efficient than the state of art primary optics.

In multi-component injection molding, materials from two or more separate streams are sequentially or simultaneously injected into a mold to create a part containing materials from the two or more separate streams. Any multi-component injection molding method known in the art can be used to manufacture the primary optic according to the invention, for example marbling, sandwich injection molding, transfer, rotation or turning stack molding.

Especially, the coupling of the two or more injection molded photometrical components means that a surface of each of the photometrical components is arranged in direct contact with a surface of one other of the photometrical components, which is a result of the multi-component injection molding process. For example, in a primary optic with two photometrical components, a surface of the first photometrical component is arranged in direct contact with a surface of the second photometrical component. For example, in a primary optic with three photometrical components, the surface of the first photometrical component is arranged in direct contact with the surface of the second photometrical component and that surface is in contact with a surface of the third photometrical component. In particular, the bonding between the photometrical components at their contacting surfaces is chemical and does not require any pre-treatment or adhesive.

Any type of light source commonly used in headlamps for motor vehicles can be provided for use with the primary optic according to the invention, for example halogen bulb, xenon gas discharge lamp and LED. It is possible to use the primary optic with one or more light sources of the same or of different types. The light emitted by the light source is being received by the primary optic and consecutively passes each of the at least two photometrical components. For example, in a primary optic with two photometrical components, the first photometrical component arranged closest to the one or more light sources is receiving the light emitted by the light sources first, refracts it to a refracted light beam, which thereafter is being received by the second photometrical component, where it is further refracted while passing the second photometrical component. Due to the coupling of the two or more photometrical components by means of multi-component injection molding, there is no negative effect when the light is being refracted by the primary optic of the invention compared to when the primary optic consists of only one injection molded photometrical component.

According to a preferred embodiment of the invention, at least one of the at least two photometrical components is made from a polycarbonate or a polymethylmethacrylate material. Especially, all photometrical components of the primary optic can be made from a polycarbonate or a polymethylmethacrylate material. Polycarbonate or polymethylmethacrylate materials can be manufactured with high precision and thus allow for a high size accuracy of the primary optic.

In a further preferred embodiment of the invention, at least one of the at least two photometrical components comprises at least one recess for the light source. Because the light source can be arranged within the recess, the photometrical component comprising the recess can receive large parts of the light emitted by the light source. The recess can also be arranged to fit more than just one light source. In a case where one photometrical component comprises more than one recess, different types of light sources can be arranged within the respective recesses. This makes it possible to provide a primary optic capable of refracting light from different light sources serving different light functions in a headlamp, for example low beam light and daytime running light.

In another preferred embodiment of the invention, at least one of the at least two photometrical components is at least partially enclosing at least one other of the at least two photometrical components. Thus, the design freedom of the primary optic is increased. Moreover, the contacting surfaces of the photometrical components can be increased, resulting in a better coupling of the photometrical components to each other. For example, in a primary optic with two photometrical components, the first photometrical component can have a W-shape or a U-shape cross section and the second photometrical component can have a semi-oval shape cross section, whereby the cross section is taken along a path of the light emitted by the light source through the at least two photometrical components. Specifically, the path of light is the shortest path the light has to travel through the at least two photometrical components in order to leave them as a refracted light beam.

In yet another preferred embodiment of the invention, at least one of the at least two photometrical components comprises at least one fastening element for fastening the primary optic within a motor vehicle. It is thereby possible, to easily fasten the primary optic within an assembly space provided for a headlamp in a motor vehicle. An example of a fastening element may be a mounting hole, pin, groove, tongue and the like. The fastening element may further be a protruding part with connection means, such as a hole, pin, groove, tongue and the like. The protruding part can be a fastening arm. The fastening arm may be arranged to extend away from the photometrical component in at least one direction substantially perpendicular to the path of the light emitted by the light source through the at least two photometrical components. The fastening arm may comprise at least one mounting hole at its at least one distal end. The at least one mounting hole may be arranged to fit a pin, screw or the like for securing the fastening arm within the assembly space, for example to a body part of the motor vehicle. The fastening arm may also comprise a groove for connecting the fastening arm to a tongue arranged inside the assembly space.

According to another embodiment of the invention, the largest thicknesses of the at least two photometrical components, which are measured along the path of the light emitted by the light source through the at least two photometrical components, is within the range of 1 mm to 4 mm, in particular within the range of 2 mm to 3 mm. Thereby, sufficient refraction of light within the primary optic in each of the photometrical components is accomplished. Moreover, the shrinkage of the primary optic of the invention is reduced compared to a primary optic manufactured as a single component, resulting in a better size accuracy of the primary optic according to the invention.

In a further embodiment of the invention, at least one of the at least two photometrical components differs from at least one other of the at least two photometrical components in at least one of: a refractive index and a color. This allows for new types of variations of the cone and color of light leaving the primary optic. The refractive index of the photometrical components can be influenced by choice of the material, the thickness and the shape of the photometrical component, for example. The color of the photometrical components can be influenced by choice of the material and mixing color pigments into the material, for example.

In yet another embodiment of the invention, at least one of the at least two photometrical components is made from the same material as the at least one other of the at least two photometrical components. This enables particularly cost-efficient manufacturing of the primary optic, because only one material needs to be supplied for the multi-component injection molding. Alternatively, it is possible that at least one of the at least two photometrical components is made from a different material than at least one other of the at least two photometrical components. Thereby it is possible to achieve the variations in the refractive index and the color of the primary optic.

According to a second aspect of the invention, the problem is solved by a headlamp for a motor vehicle comprising the primary optic according to the invention and at least one light source, whereby the light source is arranged relative to the primary optic so that light emitted by the light source is consecutively received by the at least two photometrical components.

According to a third aspect of the invention, the problem is solved by a motor vehicle comprising at least one headlamp according to the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
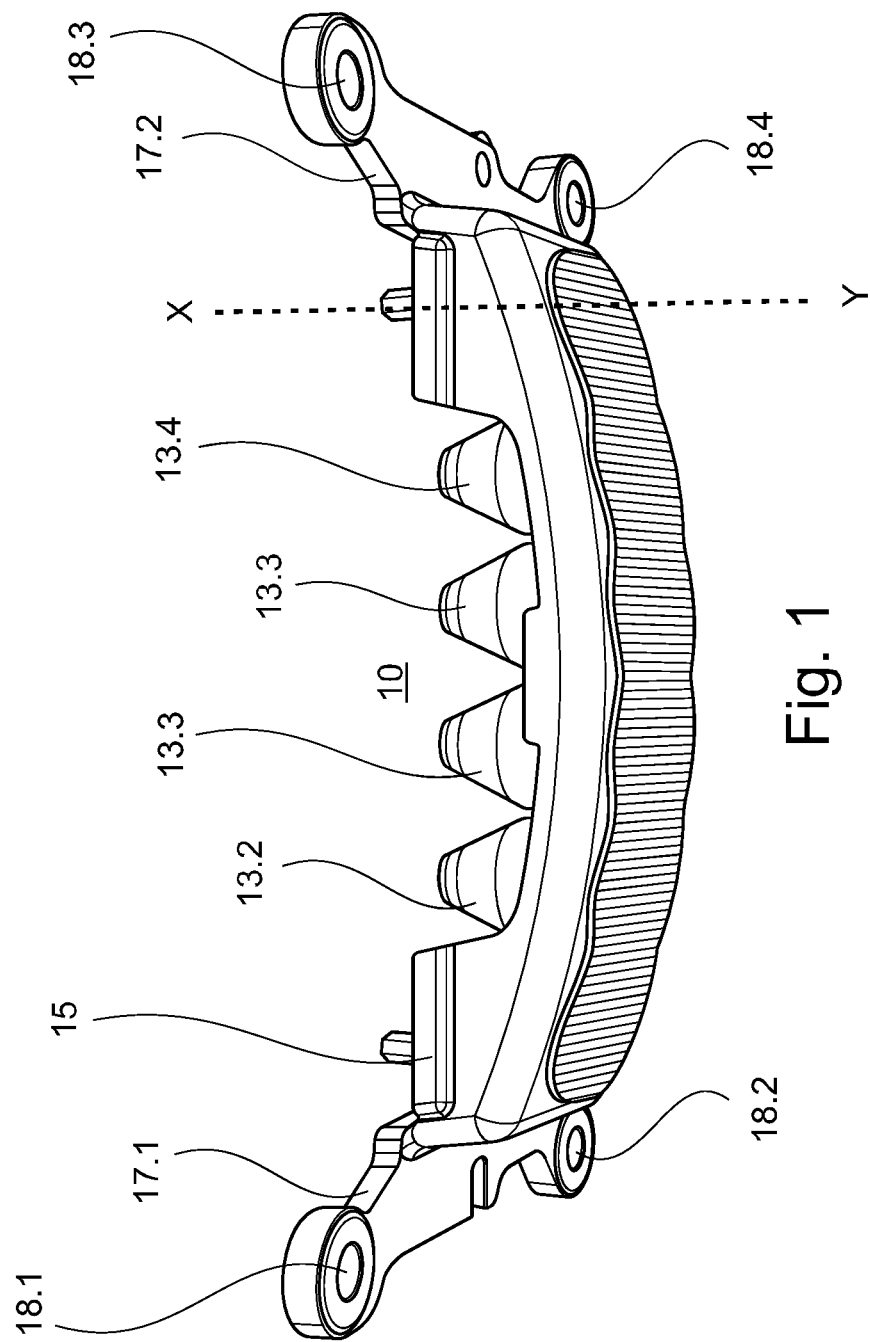
FIG. 1 shows a top view of a preferred embodiment of a primary optic according to the invention.
Figure 2:
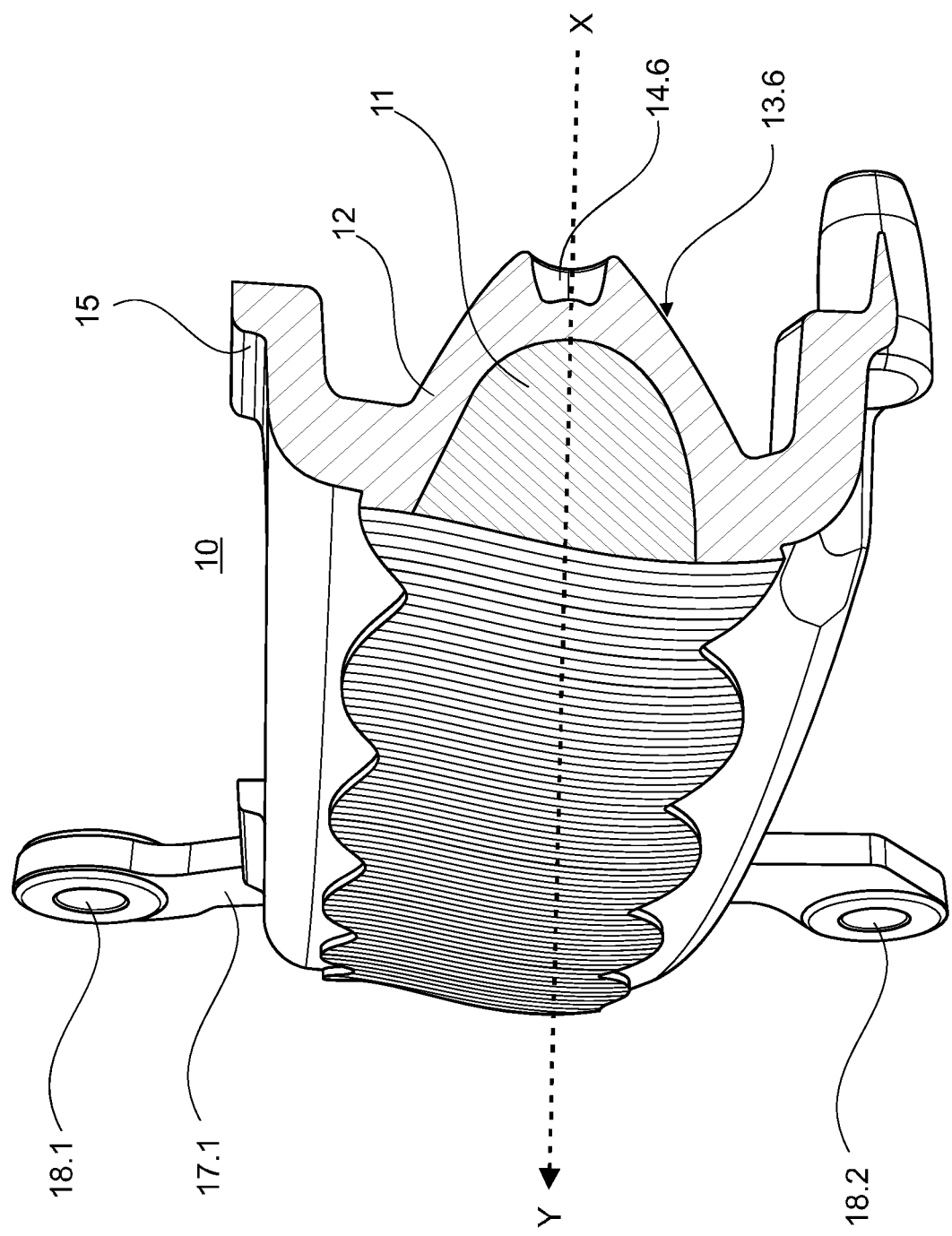
FIG. 2 shows a side sectional view of the primary optic of FIG. 1.

FIG. 1 shows a preferred embodiment of a primary optic 10 according to the invention. The primary optic 10 is a multi-component injection molding comprising two photometrical components 11, 12 as shown in FIG. 2 and will be explained in more detail later. The primary optic 10 comprises six cone-type elements 13, of which the four cone-type elements 13.2, 13.3, 13.4, 13.5 are visible in this view and the two other cone-type elements 13.1, 13.6, the cone-type element 13.1 being arranged next to the cone-type element 13.2 and the cone-type element 13.6 being arranged next to the cone-type element 13.5, are being covered by an upper protrusion 15 of the primary optic 10. Each of the cone-type elements 13 comprises a recess 14 for at least one light source 16, which is not shown in this figure but can be seen in FIG. 2 and FIG. 3. Each of the cone-type elements 13 may also comprise more than just one recess 14.

Two fastening elements 17.1, 17.2 are provided as part of the primary optic 10 at its long sides in the form of fastening arms. Each of the fastening elements 17.1, 17.2 comprises two mounting holes 18.1, 18.2, 18.3, 18.4 at its distal ends as connection means, which can be connected by means of a pin or a screw, for example, within an assembly space of a headlamp, which is not shown in this figure.

FIG. 2 shows a side sectional view of the primary optic 10 of FIG. 1 along the dotted line X-Y through the covered cone-type element 13.6. As can be seen from FIG. 2, the primary optic 10 comprises the two photometrical components 11, 12 in this embodiment of the invention, which were coupled to one another by means of multi-component injection molding. The dotted line X-Y is a path of the light emitted by the light source 16 through the two photometrical components 11, 12, when it is fitted into the recess 14 of the cone-type element 13.6 and switched on. The traveling direction of the light is indicated by an arrow. As can be seen from this perspective, the fastening element 17.1 extends away from the photometrical component in directions substantially perpendicular to the dotted line X-Y.

Figure 3:
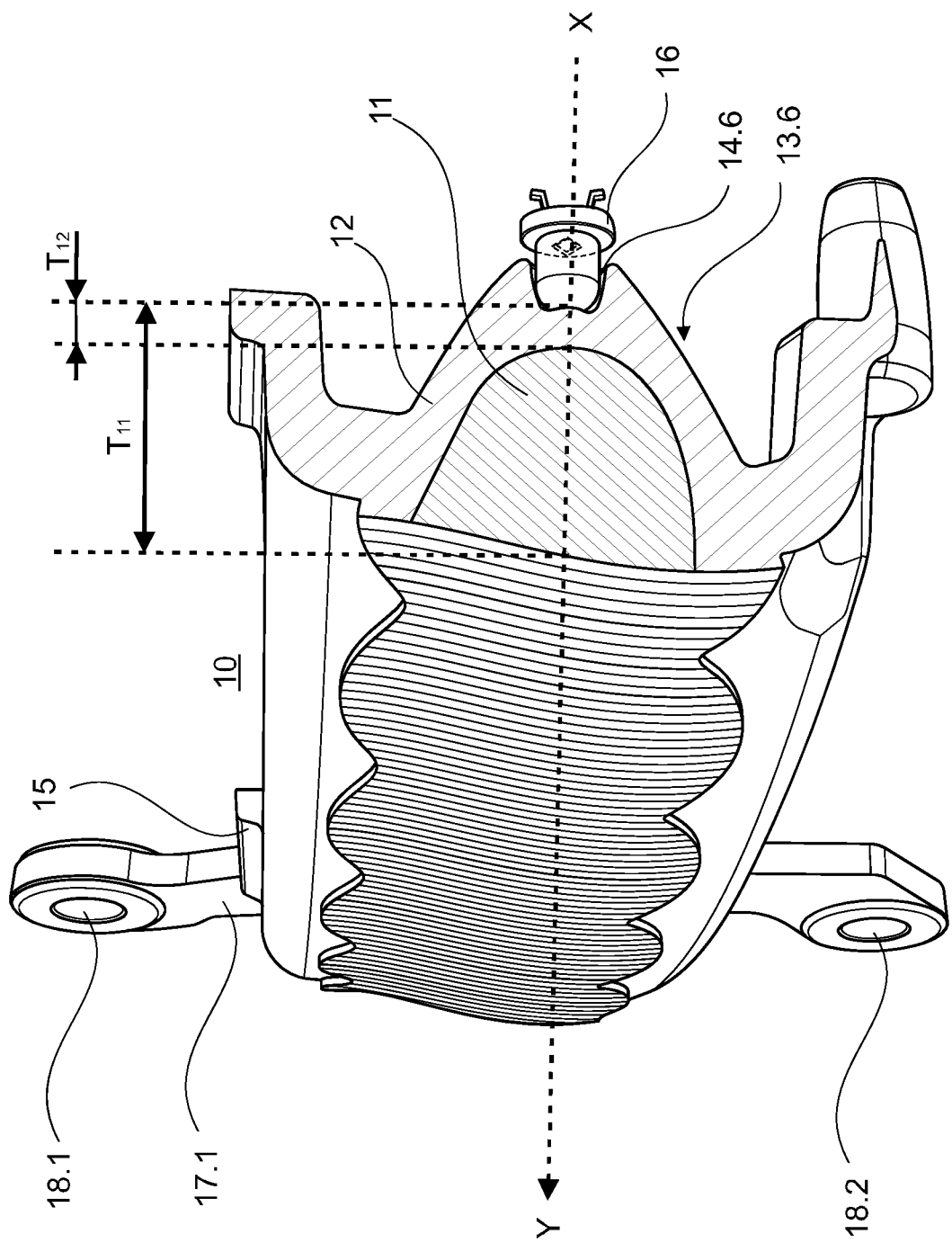
FIG. 3 shows the side sectional view of the primary optic of FIG. 2 together with a light source.

FIG. 3 shows a side sectional view of the primary optic 10 of FIG. 2 with a light source 16 fitted into the recess 14.6 of the cone-type element 13.6. The largest thicknesses T of the photometrical components 11, 12 is measured along the dotted line X-Y from the tip of the light source 16 to the point where the light emitted by the light source leaves the respective photometrical component 11, 12. In this particular embodiment, the largest thickness of the photometrical component 11 is T11=4 mm and the largest thickness of the photometrical component 12 is T12=1 mm. The largest thicknesses of the photometrical components 11, 12 can be adjusted freely, for example within the range of 0.1 mm to 5 mm. For example, the largest thicknesses of the photometrical components 11, 12 can be substantially equal to one another with a deviation of up to 10% or 20% from the largest thickness of the primary optic 10, which is the sum of the largest thicknesses of the photometrical components 11, 12.

The photometrical component 11 has a substantially semi-oval cross section and the photometrical component 12 has a substantially W-shaped cross section comprising the upper protrusion 15. The photometrical component 12 is enclosing the photometrical component 11 at its rounded circumference. However, a front surface the photometrical components 11, which is arranged towards the traveling direction of the light along its path, is not enclosed by the photometrical component 12, so that the light emitted by the light source 16, which is entering the photometrical component 12 first, leaves the photometrical component 11 at its front surface.

Figure 4:
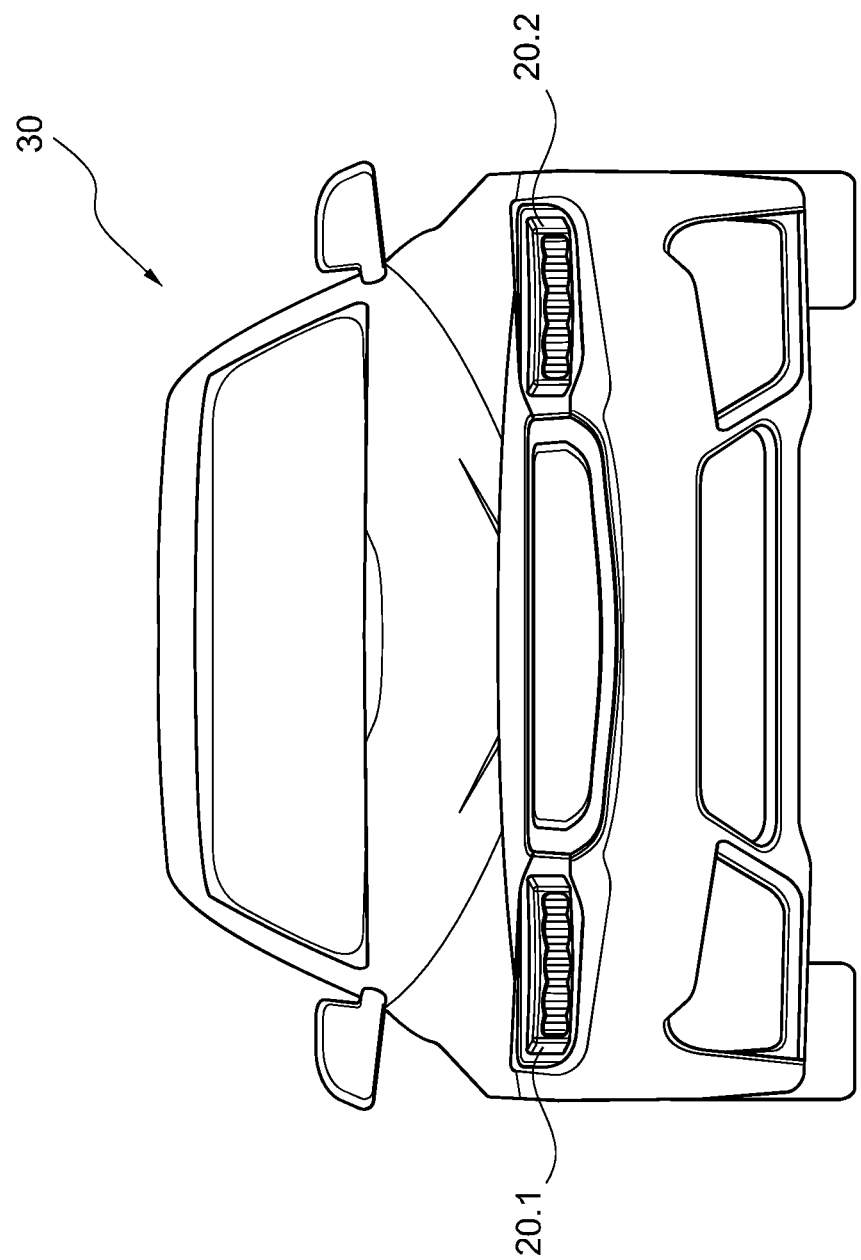
FIG. 4 shows a front view of an embodiment of a motor vehicle according to the invention.

FIG. 4 shows a front view of a motor vehicle 30 according to the invention. The motor vehicle 30 comprises two headlamps 20.1, 20.2, each of which comprises a primary optic 10 according to the invention.

REFERENCE NUMBER LIST

10 Primary optic
11, 12 Photometrical components
13 Cone-type element
14 Recess
15 Upper protrusion
16 Light source
17 Fastening element
18 Mounting hole
20 Headlamp
30 Motor vehicle
T Largest thickness of photometrical component

The invention claimed is:

1. A primary optic for a headlamp of a motor vehicle, the primary optic comprising:
   a first injection molded photometrical component coupled to a second injection molded photometrical component, such that the primary optic is a multi-component injection molding,
   whereby the first injection molded photometrical component has a first surface and a second surface,
   wherein the first surface has a substantially W-shape cross section and the second surface has a substantially semi-oval shape cross section,
   wherein the first injection molded photometrical component is arranged to receive light emitted by a light source before the second injection molded photometrical component receives light emitted by the light source,
   wherein the first surface of the first injection molded photometrical component has a recess for the light source,
   wherein the first injection molded photometrical component at least partially encloses the second injection molded photometrical component.

2. The primary optic according to claim 1, wherein at least one of the first injection molded photometrical components and the second injection molded photometrical component is made from at least one of a polycarbonate and a polymethylmethacrylat material.

3. The primary optic according to claim 1, wherein the first injection molded photometrical component comprises at least one fastening element for fastening the primary optic within a motor vehicle.

4. The primary optic according to claim 1, wherein a largest thickness of each of the first injection molded photometrical components and the second injection molded photometrical component, which are measured along a path of the light emitted by the light source through the first injection molded photometrical components and the second injection molded photometrical component, is within the range of 1 mm to 4 mm.

5. The primary optic according to claim 1, the first injection molded photometrical components differs from the second injection molded photometrical component in at least one of: a refractive index and a color.

6. The primary optic according to claim 1, wherein the first injection molded photometrical components is made from the same material as the second injection molded photometrical component.

7. A headlamp for a motor vehicle comprising:
   a primary optic as recited in claim 1,
   whereby the light source is arranged relative to the primary optic so that the light emitted by the light source is consecutively received by the first injection molded photometrical component and the second injection molded photometrical component,
   whereby the light emitted by the light source is configured to enter the first injection molded photometrical component and exit the second injection molded photometrical component.

8. A motor vehicle comprising at least one headlamp according to claim 7.

* * * * *